(No Model.) 2 Sheets—Sheet 1.

H. P. BALLOU.
CIRCULAR RIB KNITTING MACHINE.

No. 284,591. Patented Sept. 11, 1883.

Witnesses.
S. N. Piper
E. B. Pratt

Inventor
Hiram Peabody Ballou.
by R. H. Eddy atty.

N. PETERS, Photo-Lithographer, Washington, D. C.

(No Model.) 2 Sheets—Sheet 2.
H. P. BALLOU.
CIRCULAR RIB KNITTING MACHINE.
No. 284,591. Patented Sept. 11, 1883.
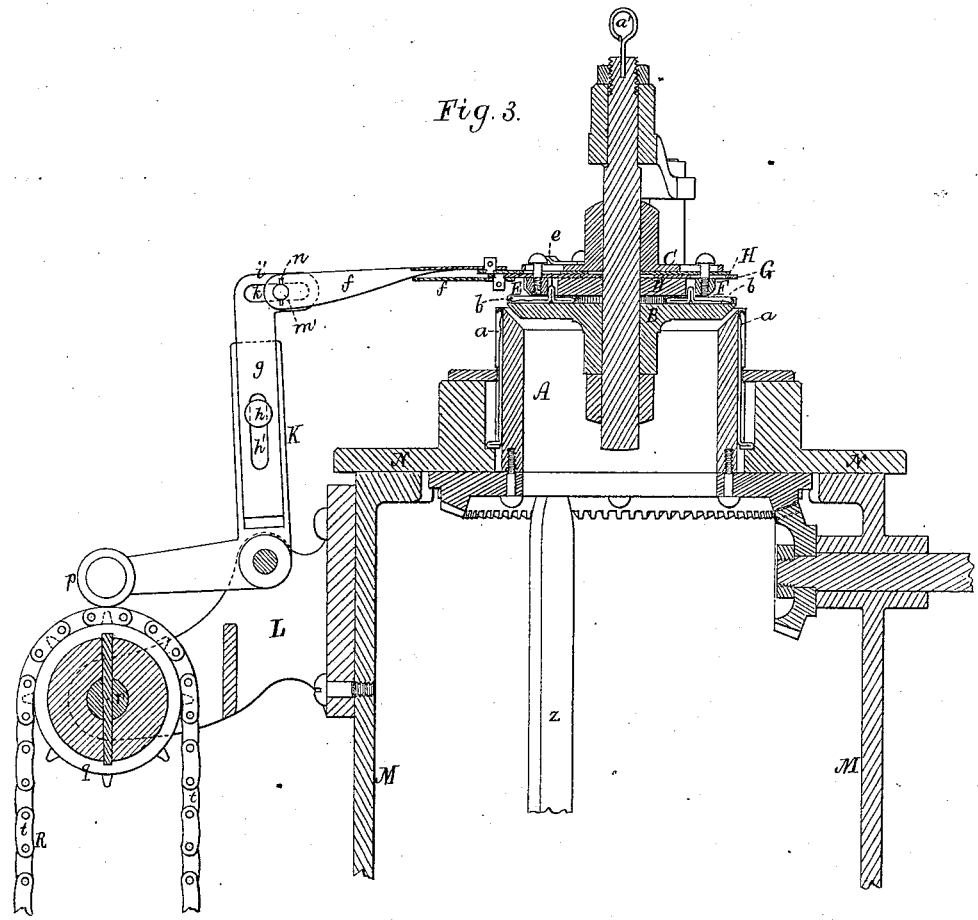
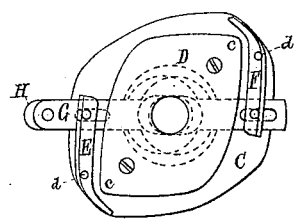
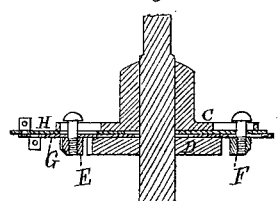
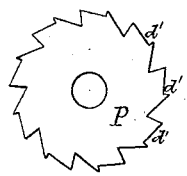
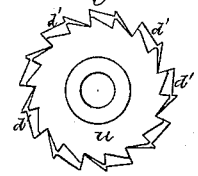
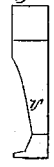
Witnesses.
S. N. Piper
E. L. Pratt
Inventor.
Hiram Peabody Ballou.
by R. H. Eddy atty.

UNITED STATES PATENT OFFICE.

HIRAM P. BALLOU, OF NEEDHAM, MASS., ASSIGNOR, BY MESNE ASSIGNMENTS, TO HIMSELF, GEORGE E. NYE, OF BRISTOL, PA., AND MINER H. A. EVANS, OF GRANITEVILLE, MASS.

CIRCULAR RIB-KNITTING MACHINE.

SPECIFICATION forming part of Letters Patent No. 284,591, dated September 11, 1883.

Application filed February 21, 1883. (No model.)

*To all whom it may concern:*

Be it known that I, HIRAM PEABODY BALLOU, of Needham, in the county of Norfolk, of the State of Massachusetts, have invented a new and useful Improvement in Circular Rib-Knitting Machines; and I do hereby declare the same to be described in the following specification and represented in the accompanying drawings, of which—

Figure 1:
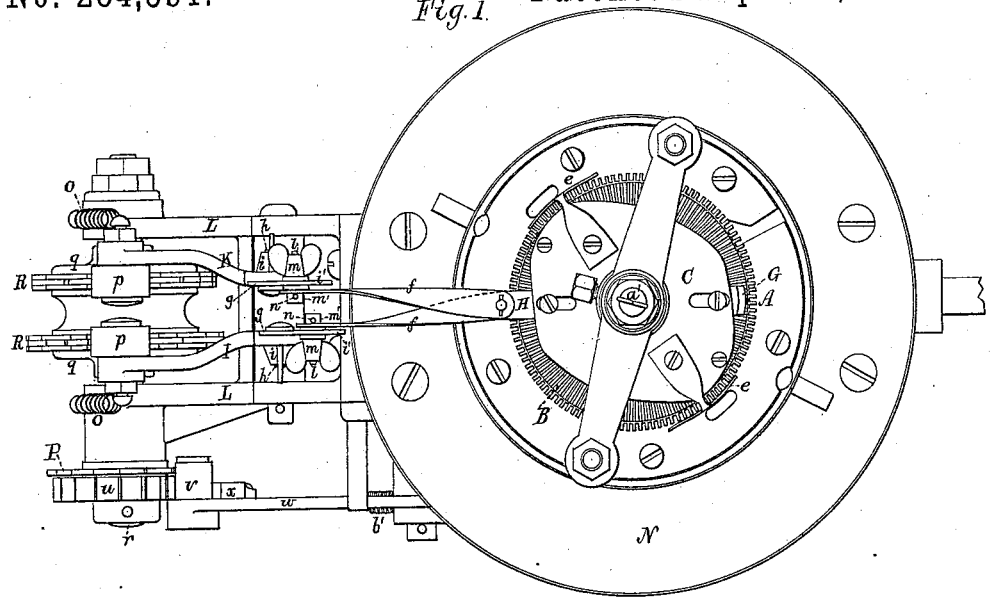
Figure 2:
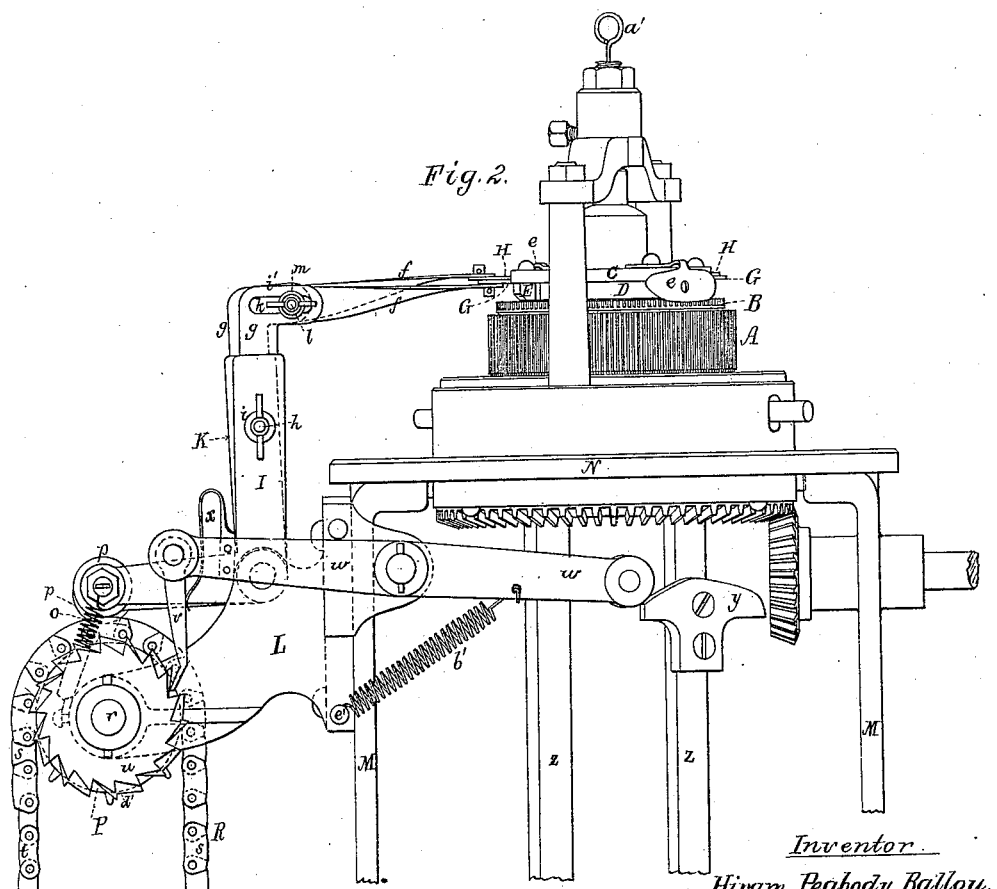

Figure 1 is a top view, Fig. 2 a side elevation, Fig. 3 a vertical and longitudinal section, of a machine embodying my invention, the nature of which is defined in the claims hereinafter presented. Fig. 4 is an under side view of the dial-needles, operative cams, and their supports. The remaining figures are hereinafter referred to and described.

The invention relates to the machine specified in Letters Patent of the United States No. 253,752, dated February 14, 1882, and granted to Geo. E. Nye and myself. In that machine there is combined with the push-out cams of the dial-needles two movable drawing-in cams and certain mechanism for operating these latter cams by manual power. In my present machine I have mechanism for automatically operating the drawing-in cams, as in practice with the said patented machine the constant and careful attention of an attendant had to be employed to move by hand certain parts of the machine to cause it to knit in due order the kind of work, whether it be "striped," "checked," or "block work." With my present machine the changes or movements of the drawing-in cams to cause different kinds of work to be produced in the order required are accomplished wholly by mechanism, the machine, after being put in operation, performing the knitting of the various kinds of work in the order and each to the extent that may be required for the production of any given pattern capable of being knit by the machine.

In the drawings, the vertical needles are shown at *a* and the horizontal ones at *b*. (See Fig. 3.) The needles of the former set are arranged in the ordinary manner in grooves in the outer periphery of a rotary cylindrical tube, A, while the horizontal needles are disposed in radial grooves within a rotary circular plate, B, usually termed the "dial."

The supporter of the cam of the dial-needles is shown at C, as furnished with the stationary cam-plate D, formed or provided with the push-out cams *c c*. The said plate D is between two movable drawing-in cams, E and F, formed and arranged, as shown in Fig. 4, on the lower part of the supporter C. Each cam is pivoted to the supporter at *d*, and also to one of two slides, G and H, arranged within the supporter and relatively to the cam-plate D, in manner as represented in said Fig. 4, and more especially in Fig. 5, which is a vertical section of the supporter and the two slides. Opposite to each push-out cam *c* is a yarn-guide, *e*. The yarns are led from their bobbins to and through a guide, *a'*, and through holes in the guides *e* to the needles.

The two slides G and H, by means of links *f f*, are connected to the upper arms of two knee-levers, I and K, arranged within and fulcrumed to a bracket, L, extending from the stand M, carrying the circular head N, for sustaining and aiding in supporting the parts above it of the knitting-machine. The connection of each link *f* with its lever I or K is by means, in part, of an adjustable and slotted slide, *g*, which is adapted to slide vertically within or on the upper arm of the lever, and is provided with a clamp-screw, *h*, and nut *i*, properly adapted to it and the lever-arm. This clamp-screw passes through a slot, *h'*, made vertically in the slide *g*. The head *i'* of the slide has in it a horizontal slot, *k*. Extending through the slot *k* is a screw, *l*, provided with a nut, *m*, for holding it in place in the slot. From the head of the screw there projects a pivot, *m'*, which goes through the link *f* and receives a pin, *n*, which extends through it transversely and serves to keep the link on the said pivot. The object of so connecting each link with the upper arm of its lever is to enable the stitches to be made longer or shorter, as occasion may require, the extent of advance of the slide being varied by changing the altitude of the slide, to increase or diminish the extent of such advance. The horizontal slot *k* and the screw *l* and nut *m* are to effect the proper adjustment of the slide and its drawing-in cam to the lever.

To the lower arm of each lever I and K and the bracket a spiral spring, o, is fixed, to draw the arm downward, so as to keep in contact with a pattern-chain, R, a friction-wheel, p, carried by a pivot, projecting from the arm. There hangs under each friction-wheel such a pattern-chain which is usually an endless one. It runs around a sprocket-wheel, q, fixed upon a shaft, r, properly journaled in the bracket. Certain of the links s of the pattern-chain R are deeper than the others t, in order that when passing over the sprocket-wheel and directly under the friction-wheel of the knee-lever, that they may act as cams to force upward the lower arm of the lever at the proper times, for the slide G or H, connected with such lever, to be moved, in order to move a drawing-in cam, as may be required, to effect a change in the style of knitting. While the larger link or links may be passing underneath the friction-wheel, the lever-arm thereof will be kept raised.

There is fixed on the shaft r a ratchet-wheel, u. A pawl, v, extending down from a lever, w, fulcrumed to the bracket, engages with the said ratchet-wheel, and is pressed up to it by a spring, x. The lever w carries at its rear end a friction-wheel, which, in each revolution of the tube A, is met by and passed over a cam, y, attached to the frame z, that supports the draw-rollers for drawing downward the work. A spiral spring, b', attached to the rear arm of the said lever and to a projection, e', from the bracket, produces a counter movement of the lever.

In order that the ratchet-wheel u may be moved only by the pawl, not at each downward movement of the pawl, but once during each two downward movements of it, I have, aside of the ratchet-wheel, and to revolve on the shaft r, another and peculiar auxiliary ratchet-wheel, P, a side view of which is given in Fig. 6. It has half the number of teeth in it that the ratchet-wheel u has, and each tooth has between it and the next tooth, in advance of it, an angular space like that between each two next adjacent teeth of the ratchet-wheel u. Each tooth of the wheel P is deeper than a tooth of the ratchet-wheel u, and is notched at top in manner as shown at d'. Fig. 7 shows a side view of the two ratchet-wheels as made and their relative proportions. Fig. 8 is a side view of the pawl v, from which it will be seen that the pawl is to extend across both the ratchet-wheels. In a descent of the pawl it will act against teeth of both the wheels, and turn said wheels simultaneously; but in rising the pawl will pass upward into a notch of the auxiliary wheel, which will keep the pawl in its next descent entirely out of engagement with the ratchet-wheel u. The pawl in the said next descent of it will only turn the auxiliary ratchet-wheel, and consequently the pawl will revolve the ratchet-wheel u only every other time that the pawl may descend. By having the auxiliary ratchet-wheel, which should move with friction against the main ratchet-wheel in order to maintain them in their proper relations, I need have each of the pattern-chains but half the length that would be required were the ratchet-wheel u to be operated or turned during each down movement of the pawl, and thus I save expense in construction of the pattern-chains, as well as room for them to work in.

I claim—

1. In a circular rib-knitting machine, the push-out and draw-in cams c c, E, and F, and their operative slides G and H, and their links f f, in combination with the knee-levers I and K, springs o o, sprocket-wheel q, shaft r, pattern-chains R R, ratchet-wheel u, lever w, pawl v, springs b' x, and cam y, all arranged and adapted essentially as set forth.

2. The combination of the slotted and adjustable slides g g and their clamp-screws and nuts with the knee-levers I K and the links f f of the slides G and H of the drawing-in cams, as set forth.

3. The auxiliary ratchet-wheel P, in combination with the main ratchet-wheel u and their single operative pawl v, arranged as set forth, whereby the pawl only operates the wheel u every alternate stroke.

4. The combination, substantially as described, for automatically actuating the slides of the drawing-in cams, it consisting of the knee-levers I and K, springs o o, sprocket-wheel q, shaft r, pattern-chains R R, ratchet-wheels u P, their single pawl v, lever w, springs x b', and cam y, arranged and adapted to the knitting-machine, essentially as set forth.

HIRAM PEABODY BALLOU.

Witnesses:
R. H. EDDY,
E. B. PRATT.